United States Patent [19]
Grois et al.

[11] Patent Number: 5,761,360
[45] Date of Patent: Jun. 2, 1998

[54] FIBER OPTIC CONNECTOR WITH FIBER GRIPPING MEANS

[75] Inventors: Igor Grois, Northbrook; Ilya Makhlin, Wheeling; Michael J. Pescetto, Plainfield, all of Ill.

[73] Assignee: Molex Incorporated, Lisle, Ill.

[21] Appl. No.: 666,185

[22] Filed: Jun. 19, 1996

[51] Int. Cl.[6] ............................................. G02B 6/36
[52] U.S. Cl. ....................... 385/81; 385/62; 385/87; 385/83; 385/136
[58] Field of Search ........................... 385/81, 62, 84, 385/78, 83, 86, 87, 136, 137, 139

[56] References Cited

U.S. PATENT DOCUMENTS

| | | |
|---|---|---|
| 4,865,412 | 9/1989 | Patterson ............................ 350/96.21 |
| 5,159,655 | 10/1992 | Ziebol et al. ............................. 385/81 |
| 5,301,250 | 4/1994 | Cheng ....................................... 385/76 |
| 5,337,390 | 8/1994 | Henson et al. ............................ 385/81 |

Primary Examiner—Phan T. H. Palmer
Attorney, Agent, or Firm—A. A. Tirva

[57] ABSTRACT

A fiber optic connector defines an optical axis and includes a housing mounting a forwardly protruding ferrule. A bore extends axially through the housing and the ferrule for terminating a fiber optic cable, with an exposed optical fiber in the bore of the ferrule. A spring loaded gripping clamp is mounted on the housing for receiving and gripping the optical fiber when inserted into the ferrule. The spring loaded gripping clamp is movable between a normally closed position for gripping the fiber and an open position for receiving the fiber. An appropriate tool can be used in moving the gripping clamp to its open position.

16 Claims, 3 Drawing Sheets

FIBER OPTIC CONNECTOR WITH FIBER GRIPPING MEANS

FIELD OF THE INVENTION

This invention generally relates to the art of fiber optic connectors and, particularly, to a fiber optic connector with an improved means for gripping the fiber of a fiber optic cable.

BACKGROUND OF THE INVENTION

In the optical fiber field, lightguide fibers are used in optical transmission systems wherein the fibers are connected end-to-end to transfer light or optical energy therebetween. The fibers typically are terminated in connector assemblies which center the fibers and, preferably, provide low insertion losses. The connectors are coupled together, or a connector is coupled to another optical transmission device so that the encapsulated fibers are in mating relationship.

Fiber optic connectors commonly use ferrules to ensure alignment of the fibers. In order to provide a good optical connection, as well as to ensure the structural integrity of the connector, the fiber must be held tightly in the connector. Typically, this is accomplished by using an adhesive. Most commonly, an epoxy is used to hold the fiber in a connector housing and an associated ferrule. Once the epoxy hardens, it cannot be loosened. Therefore, if a fiber is incorrectly installed in the connector housing and ferrule, or the fiber is damaged subsequent to installation, the housing and the ferrule cannot be reused.

In order to overcome the permanency of epoxy adhesives, hot melt adhesives have been used to hold the fiber in the fiber optic connector. While this approach has the advantage of being reusable, it requires that the assembly be heated above the softening temperature of the adhesive upon either the insertion or removal of the fiber. Consequently, this approach is very cumbersome and is not cost effective, because separate assembly or disassembly steps and heating equipment are required.

A disadvantage of both epoxies and hot melt adhesives is that they require a time delay from the time the fiber is installed in order to harden the adhesive. In addition, the use of any type of adhesive requires maintenance of additional inventories thereof, often requires clean-up procedures and simply is not as efficient as purely mechanical assembly procedures and apparatus.

In order to overcome the problems associated with the use of epoxies or hot melt adhesives, various mechanical holding systems have been proposed wherein the fiber is gripped tightly by mechanical means to firmly hold it in the connector housing and the ferrule. One such approach is shown in U.S. Pat. No. 5,337,390 dated Aug. 9, 1994. That patent shows a gripping device which clamps the optical fiber, and a plug is inserted through an opening in the connector housing to apply a compressive force to the gripping device and clamp the fiber firmly within the connector housing. While providing an effective holding means, a problem with such systems is that they require several parts which must be accurately constructed because of the interaction between the holding parts and the housing, and such plugs often become permanent, undesirable components of the connector assembly.

The present invention is directed to solving the various problems described above by providing a purely mechanical holding means for an optical fiber in a fiber optic connector. The holding means is in the form of a spring clamp which is spring loaded to provide its own self-contained holding forces. The fiber is inserted into the connector simply by opening the spring clamp with an appropriate tool, whereafter the tool is removed and the fiber is firmly gripped within the connector.

SUMMARY OF THE INVENTION

An object, therefore, of the invention is to provide a new and improved fiber optic connector with a novel gripping means.

In the exemplary embodiment of the invention, the fiber optic connector includes a housing mounting a forwardly protruding ferrule. Aligned bore means extend axially through the housing and ferrule for terminating a fiber optic cable with an optical fiber in the bore means of the ferrule. A spring loaded gripping means is mounted on the housing for receiving and gripping the optical fiber when inserted into the ferrule. The spring loaded gripping means is movable between a normally closed position for gripping the fiber and an open position for receiving the fiber.

As disclosed herein, the spring loaded gripping means is provided by a one-piece metal spring clamp. The clamp is generally V-shaped to define a pair of clamp arms for clamping the optical fiber therebetween. The clamp arms have aligned grooves on the inside thereof for positioning the optical fiber. The clamp arms also have outwardly flared ends defining a mouth for receiving an appropriate tool to spread the arms and thereby opening the gripping clamp.

The novel gripping means of the invention is shown incorporated in a fiber optic connector which includes a conventional coupling ring mounted on the housing for movement relative thereto. Typically, the coupling ring is mounted for axial movement relative to the housing between an uncoupling position and a coupling position. A spring is operatively associated between the housing and the coupling ring for biasing the coupling ring toward its uncoupling position. The invention contemplates that the coupling ring include cam means for moving an appropriate tool into engagement with the gripping means to move the gripping means to its open position. Specifically, the cam means is located for engaging the tool in response to axially moving the coupling ring from its uncoupling position to its coupling position.

Lastly, the housing includes an access area providing access to the gripping means by the tool used in moving the gripping means to its open position. With the coupling ring type connector, the access area is provided between the inside of the coupling ring and the outside of the housing, whereby the tool can be inserted thereinto from the terminating end of the connector. Therefore, additional access openings are not required through the coupling ring.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
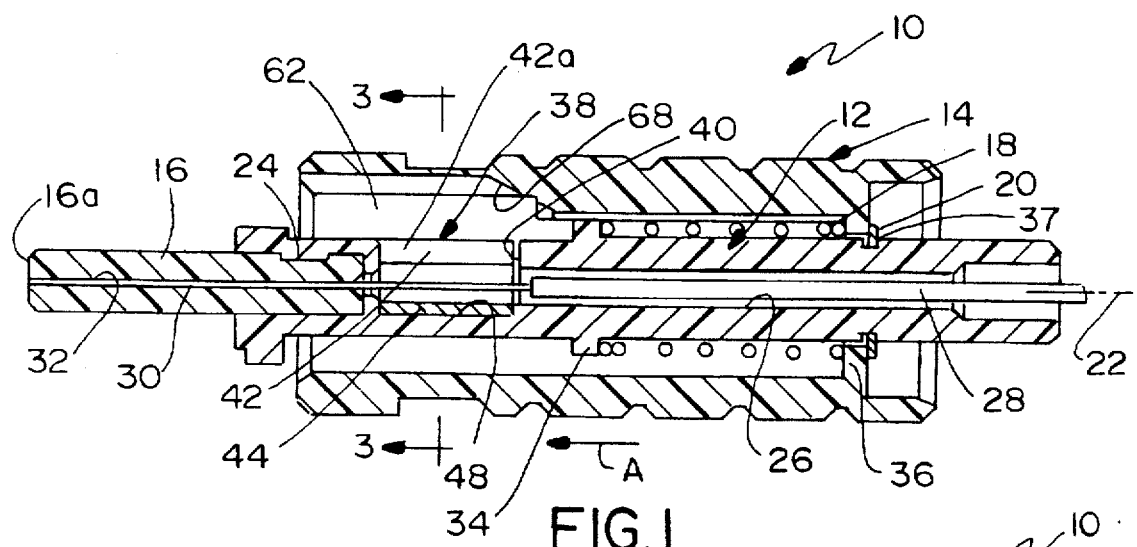
FIG. 1 is an axial section through a fiber optic connector incorporating the fiber gripping means of the invention.
Figure 2:
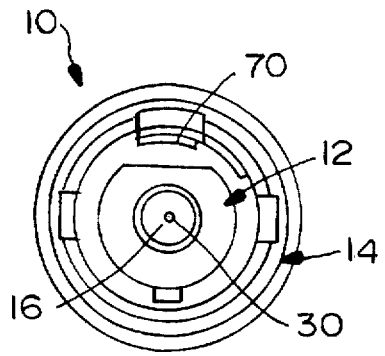
FIG. 2 is an end elevational view looking toward the left-hand end of FIG. 1.
Figure 3:
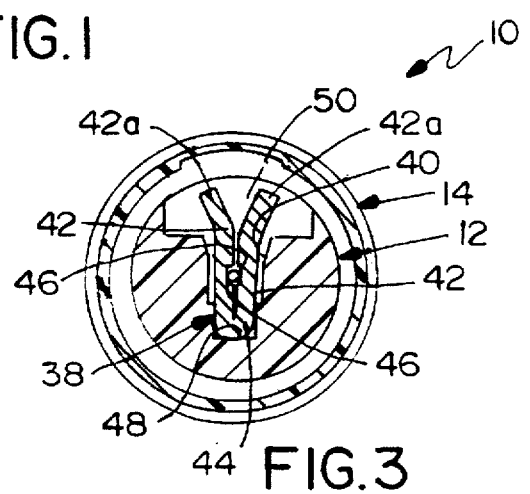
FIG. 3 is a vertical section taken generally along line 3—3 of FIG. 1.

Referring to the drawings in greater detail, and first to FIGS. 1-3, the invention is incorporated in a fiber optic connector, generally designated 10, which includes three main components, namely: an inner housing, generally designated 12; an outer coupling ring, generally designated 14; and a forwardly projecting ferrule 16. In addition, the connector includes a coil spring 18 about a given length of housing 12, along with a C-washer 20 to hold the coupling ring on the housing. The entire fiber optic connector defines an optical axis 22.

More particularly, housing 12 of fiber optic connector 10 may be fabricated of dielectric material, such as plastic or the like. The housing mounts ferrule 16 at the forward end thereof by appropriate mounting flange means 24 such that the ferrule projects forwardly of the housing and terminates in a flat distal end 16a. The ferrule is cylindrical and conventionally is fabricated of ceramic or like material. The housing has bore means 26 for receiving a fiber optic cable 28, with an exposed length of the fiber 30 of the cable projecting into a bore 32 of ferrule 16. Bore means 26 within housing 12 and bore 32 within ferrule 16 are axially aligned and aligned with optical axis 22.

Coupling ring 14 surrounds a substantial portion of housing 12 and is mounted about the housing for both axial and circumferential movement relative thereto. The coupling ring is shown in FIG. 1 in an uncoupling position. Coil spring 18 is sandwiched between an outwardly projecting circumferential flange 34 of housing 12 and an inwardly projecting circumferential flange 36 of coupling ring 14 to bias the coupling ring toward its uncoupling position, as shown. C-washer 20 is positioned in a groove 37 about housing 12 and holds the coupling ring onto the housing by engagement with the rear side of flange 36, as the front side of the flange engages the rear end of coil spring 18. The coupling ring is movable axially forwardly in the direction of arrow "A" to a coupling position, compressing coil spring 18, as will be seen hereinafter.

The invention contemplates a spring loaded gripping means, generally designated 38, positioned within an opening 40 in housing 12. As best seen in FIG. 3, spring loaded gripping means 38 is provided in the form of a one-piece spring clamp fabricated of metal or like springy material. The spring clamp is generally V-shaped and defines a pair of clamp arms 42 as best seen in FIG. 3. The clamp arms are unitary at their base 44 (see FIG. 1) whereby the base forms a hinge for the clamp arms. The clamp arms have aligned grooves 46 on the inside surfaces thereof for positioning optical fiber 30 on axis 22. This positioning is quite precise because the bottom of the-V-shaped spring clamp rigidly abuts a bottom wall 48 of opening 40 in housing 12. The clamp arms have outwardly flared ends, as at 42a (see FIG. 3), defining a mouth 50 for receiving an appropriate tool to spread the arms and thereby open the gripping means, as described below.

FIGS. 4-7A show sequential views in operating fiber optic connector 10, and particularly spring loaded gripping means or clamp 38, in conjunction with a loading tool, generally designated 52. The loading tool has a central passage 54 for receiving ferrule 16 of fiber optic connector 10. The tool has a generally cylindrical boss 56 with surfaces 58 for engaging or abutting against the front of housing 12 of the connector. An actuating arm 60 projects from the tool into an access area 62 between housing 12 and coupling ring 14. The actuating arm has an end 64 with an angled cam surface 66 for engaging a cam surface 68 within coupling ring 14. The tool is fabricated of an appropriate semi-rigid material which allows for flexing of actuating arm 60.

Figure 4:
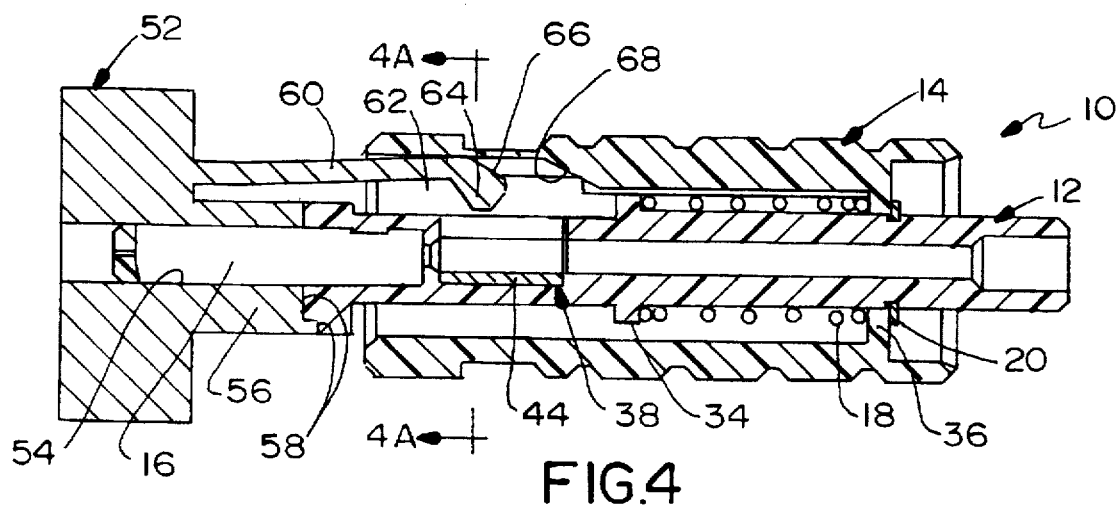
FIGS. 4 and 4A are views similar to that of FIGS. 1 and 3, respectively, with the coupling ring of the connector in its uncoupling position, with the spring clamp in its normally closed position, with the loading tool inserted into the connector and without a fiber optic cable.
Figure 4A:
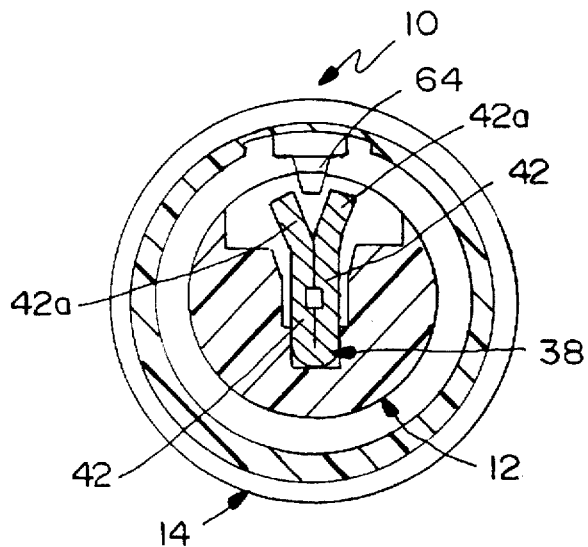

FIGS. 4 and 4A show loading tool 52 engaged with housing 12 of fiber optic connector 10, and with actuating arm 60 extending into access area 62 between the housing and coupling ring 14. The coupling ring is in its uncoupling position and held thereat by coil spring 18.

Figure 5:
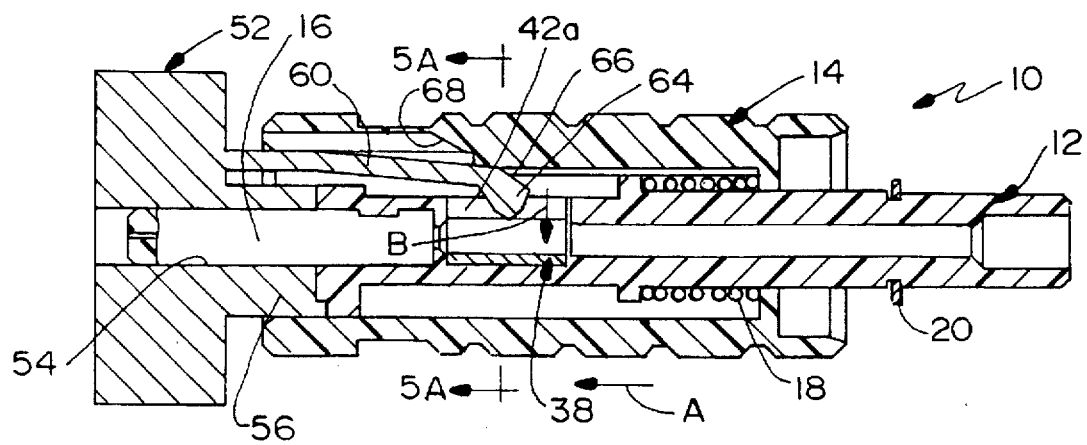
FIGS. 5 and 5A are views similar to FIGS. 4 and 4A, respectively, but with the coupling ring moved to its coupling position actuating the loading tool and spreading the spring clamp, still without insertion of the fiber optic cable.
Figure 5A:
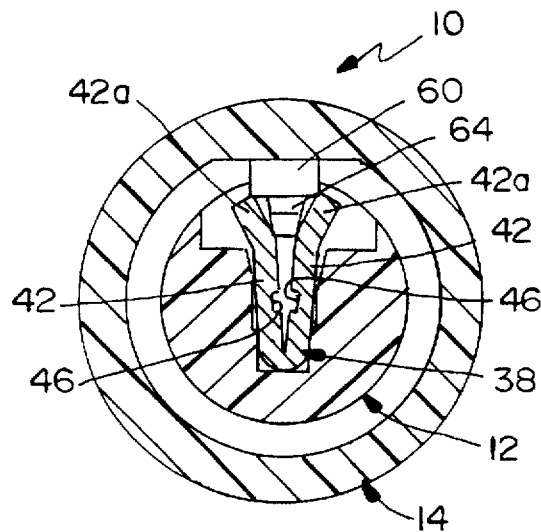

FIGS. 5 and 5A show coupling ring 14 having been moved forwardly in the direction of arrow "A" which causes cam surface 68 on the interior of the coupling ring to engage cam surface 66 at the outside of end 64 of actuating arm 60 and, thereby, drive the actuating arm radially inwardly in the direction of arrow "B". FIG. 5A best shows that end 64 of actuating arm 60 has been driven into mouth 50 (FIG. 3) between clamp arms 42 of spring clamp 38 to spread the arms and thereby open the gripping means for receiving optical fiber 30 of fiber optic cable 28.

Figure 6:
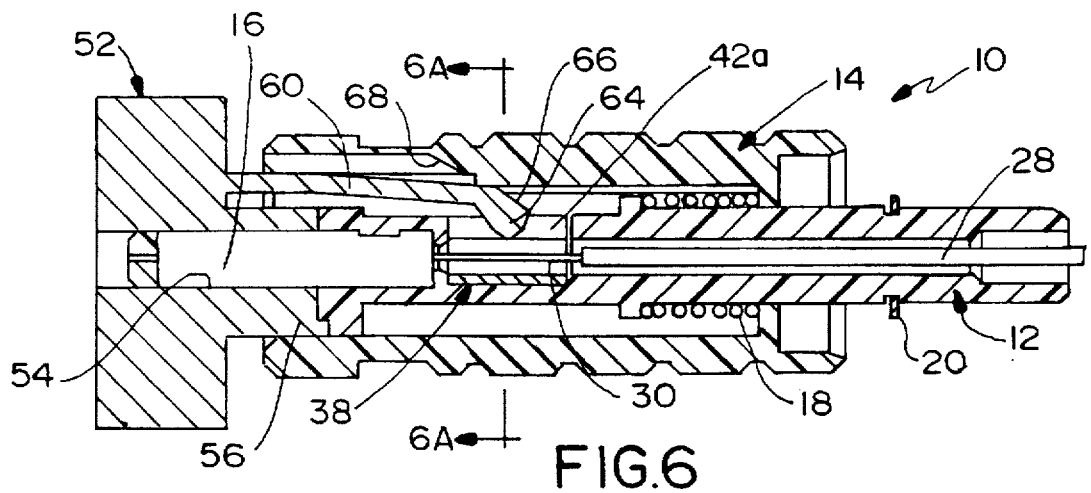
FIGS. 6 and 6A are views similar to FIGS. 5 and 5A, respectively, but with the fiber optic cable inserted into the connector housing and ferrule.
Figure 6A:
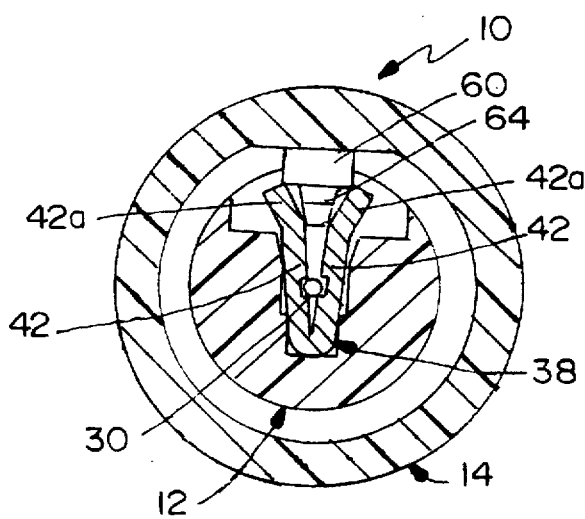

FIGS. 6 and 6A show actuating arm 60 of loading tool 52 still spreading clamp arms 42 of spring clamp 38, but with fiber optic cable 28 now inserted into the connector. The cable is inserted axially into bore means 26 of the housing, with the exposed fiber 30 passing between clamp arms 42 of spring clamp 38 and into bore 32 of ferrule 16. The fiber is in alignment with grooves 46 on the inside surfaces of clamp arms 42.

At this point, it should be understood that the position of coupling ring 14 shown in FIGS. 5 and 6 corresponds to the normal coupling position of the ring. In other words, this is the position of the coupling ring when fiber optic connector 10 is coupled to a complementary mating fiber optic connector, an adaptor, another fiber transmission device or the like. The coupling ring is provided with various coupling means on the inside thereof such as screw threads, bayonet coupling grooves or the like. FIG. 2 shows a bayonet coupling groove 70 on the inside of the coupling ring for receiving a bayonet pin from a complementary mating connector as the coupling ring is moved axially and then rotated circumferentially, such coupling means being well known in the art. The invention uses the conventional action of the coupling ring as the means for actuating loading tool 52, particularly for moving actuating arm 60 into engagement with spring clamp 38.

Figure 7:
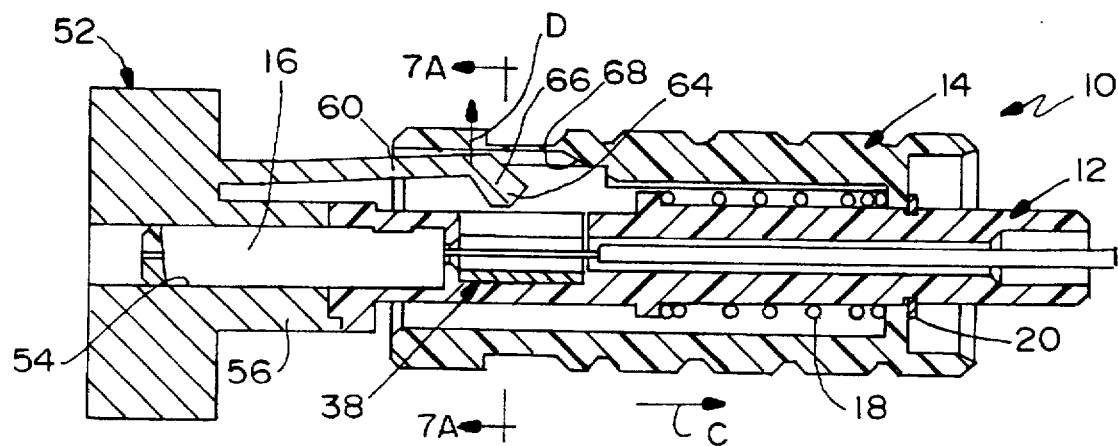
FIGS. 7 and 7A are views similar to FIGS. 6 and 6A, respectively, but with the coupling ring moved back to its uncoupling position as shown in FIG. 4 and with the spring clamp in its closed position gripping the optical fiber.
Figure 7A:
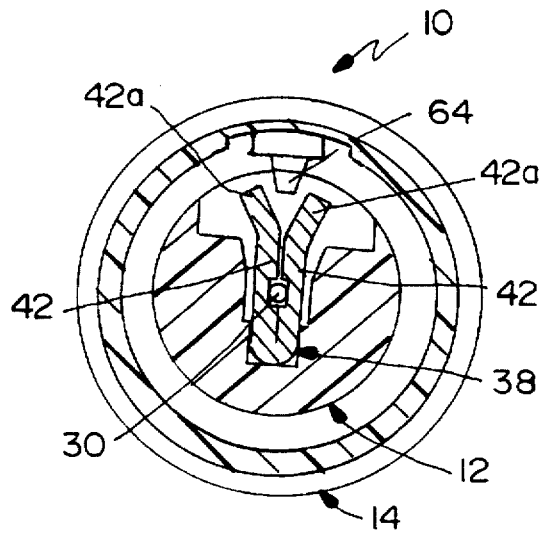

FIGS. 7 and 7A show coupling ring 14 having been moved back in the direction of arrow "C" to its uncoupling position corresponding to that shown in FIG. 4. Actuating arm 60 of loading tool 52 returns in the direction of arrow "D" to its inoperative position under its own resiliency. The tool now can be removed from the connector for further use. As the actuating arm moves back to its inoperative position, clamp arms 42 of spring clamp 38 move under their own spring load into gripping engagement with fiber 30 which has been located within grooves 46 on the insides of the arms.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A fiber optic connector defining an optical axis, comprising:

a housing mounting a forwardly protruding ferrule and having aligned bore means extending axially through the housing and ferrule with an exposed optical fiber in the bore means of the ferrule;

a spring loaded gripping means on the housing for receiving and gripping the optical fiber when inserted into the ferrule, the spring loaded gripping means being movable between a normally closed position for gripping the fiber and an open position for receiving the fiber; and wherein said spring loaded gripping means comprises a one-piece spring clamp.

2. The fiber optic connector of claim 1 wherein said spring clamp is generally V-shaped define a pair of clamp arms for clamping the optical fiber therebetween.

3. The fiber optic connector of claim 2 wherein said clamp arms have aligned grooves on the insides thereof for accommodating the optical fiber.

4. The fiber optic connector of claim 2 wherein said clamp arms have outwardly flared ends defining a mouth for receiving an appropriate tool to spread the arms and thereby open the clamp.

5. The fiber optic connector of claim 1, including a coupling ring mounted on the housing for movement relative thereto, the coupling ring including cam means for moving an appropriate tool into engagement with the gripping means to move the gripping means to its open position.

6. The fiber optic connector of claim 5 wherein said coupling ring is mounted on the housing for axial movement relative thereto between an uncoupling position and a coupling position, with the cam means located for engaging the tool in response to axially moving the coupling ring from its uncoupling position to its coupling position.

7. The fiber optic connector of claim 6, including spring means operatively associated between the housing and the coupling ring for biasing the coupling ring toward its uncoupling position.

8. The fiber optic connector of claim 1 wherein said housing includes an access area providing access to the gripping means by an appropriate tool used in moving the gripping means to its open position.

9. The fiber optic connector of claim 1 wherein said spring clamp is fabricated of metal material.

10. A fiber optic connector defining an optical axis, comprising:

a housing mounting a forwardly protruding ferrule and having aligned bore means extending axially through the housing and ferrule with an exposed optical fiber in the bore means of the ferrule;

a one-piece spring clamp on the housing for receiving and gripping the optical fiber when inserted into the ferrule, portions of the spring clamp being movable between a normally closed position for gripping the fiber and an open position for receiving the fiber;

a coupling ring mounted on the housing for movement relative thereto between an uncoupling position and a coupling position, the coupling ring including cam means located for engaging and moving an appropriate tool into engagement with the spring clamp to move the spring clamp to its open position in response to moving the coupling ring from its uncoupling position to its coupling position; and the housing and the coupling ring being dimensioned and structured to provide an access area allowing access to the spring clamp by the tool used to move the clamp to its open position.

11. The fiber optic connector of claim 10 wherein said spring clamp is generally V-shaped define a pair of clamp arms for clamping the optical fiber therebetween.

12. The fiber optic connector of claim 11 wherein said clamp arms have aligned grooves on the insides thereof for accommodating the optical fiber.

13. The fiber optic connector of claim 11 wherein said clamp arms have outwardly flared ends defining a mouth for receiving the tool to spread the arms and thereby open the spring clamp.

14. The fiber optic connector of claim 10 wherein said spring clamp is fabricated of metal material.

15. The fiber optic connector of claim 10, including spring means operatively associated between the housing and the coupling ring for biasing the coupling ring toward its uncoupling position.

16. A system for terminating a fiber optic cable, comprising:

a fiber optic connector defining an optical axis and including a housing having bore means extending axially therethrough for receiving the fiber optic cable with an exposed optical fiber end, a spring loaded gripping means on the housing for receiving and gripping the optical fiber when inserted into said bore means, the spring loaded gripping means being movable between a normally closed position for gripping the fiber and an open position for receiving the fiber, and a coupling ring mounted on the housing for movement relative thereto between an uncoupling position and a coupling position and including cam means; and a loading tool insertable into an access opening between the coupling ring and the housing, at least a portion of the tool being movable between an inoperative position and an operative position for moving the gripping means to its open position, the cam means on the coupling ring being located for engaging the movable portion of the loading tool and moving the portion to its operative position opening the spring loaded gripping means in response to moving the coupling ring from its uncoupling position to its coupling position.

* * * * *